US005513352A

United States Patent [19]

Tozuka

[11] Patent Number: 5,513,352

[45] Date of Patent: Apr. 30, 1996

[54] ELECTRONIC MUSICAL INSTRUMENT HAVING SECONDARY STORAGE OF FILES WITH COMMON CONSTITUENT PORTIONS IDENTIFIED BY ENTRY NAME

[75] Inventor: Akira Tozuka, Hamamatsu, Japan

[73] Assignee: Yamaha Corporation, Shizuoka, Japan

[21] Appl. No.: 324,154

[22] Filed: Oct. 14, 1994

Related U.S. Application Data

[63] Continuation of Ser. No. 821,363, Jan. 16, 1992, abandoned.

[30] Foreign Application Priority Data

Jan. 17, 1991 [JP] Japan .................................... 3-017009

[51] Int. Cl.$^6$ ............................ G06F 12/00; G06F 13/00

[52] U.S. Cl. .......................... 395/600; 395/404; 395/456; 395/497.04; 84/601; 84/609; 364/DIG. 1; 364/282.1; 364/248.1; 364/243.1

[58] Field of Search ....................... 364/DIG. 1, DIG. 2; 395/600, 456, 404, 497.04; 84/609, 601

[56] References Cited

U.S. PATENT DOCUMENTS 4,730,252 3/1988 Bradshaw ................................ 364/403
4,788,672 11/1988 Toyooka et al. .......................... 369/32
4,807,182 2/1989 Queen ..................................... 395/144
4,912,637 3/1990 Sheedy .................................... 395/600
4,960,030 10/1990 Fujimori .................................. 84/609
5,056,021 10/1991 Ausborn .................................. 364/419
5,220,119 6/1993 Shimada ................................... 84/609
5,270,476 12/1993 Rokkaku et al. ......................... 84/609
5,280,438 1/1994 Kanemaru ............................... 364/561
5,369,216 11/1994 Miyamoto ............................... 84/609

FOREIGN PATENT DOCUMENTS 60-07671 1/1985 Japan .

OTHER PUBLICATIONS

Theodor Nelson, "The Tyranny of the File", Dec. 15, 1986 pp. 83–85.

*Primary Examiner*—Thomas G. Black
*Assistant Examiner*—Jean R. Homere
*Attorney, Agent, or Firm*—Loeb & Loeb

[57] ABSTRACT

Disclosed is an electronic appliance, for example such as an electronic musical instrument, having a secondary storage device for storing data to be recorded which can be easily divided into divisional elements under a plurality of predetermined items. With respect to information to be stored in the secondary storage device, a portion the same as the already stored information is not newly stored to thereby effectively use the storage capacity of the secondary storage device. In the electronic appliance, specifically, data to be stored as one file in the secondary storage device is divided into a plurality of constituent portions under predetermined items, file names are affixed respectively to files, and entry names are affixed respectively to the itemized constituent portions. A file to be newly stored is divided into a plurality of constituent portions under the predetermined items and a judgment is made as to whether any of the constituent portions of the new file is the same as any of the already stored constituent portions of the other file with respect to one and the same item, so that the same entry name is affixed to the same constituent portion without storing the contents of the constituent component in duplication so that the same data is used in common to a plurality of files.

8 Claims, 18 Drawing Sheets

| | |
|---|---|
| A : | A1, A2, A3, --- |
| B : | B1, B2, B3, --- |
| C : | C1, C2, C3, --- |
| D : | D1, D2, D3, --- |
| E : | E1, E2, E3, --- |

| | | | |
|---|---|---|---|
| N(A1) | N(A2) | N(A3) | --- |
| N(B1) | N(B2) | N(B3) | --- |
| N(C1) | N(C2) | N(C3) | --- |
| N(D1) | N(D2) | N(D3) | --- |
| N(E1) | N(E2) | N(E3) | --- |

| | |
|---|---|
| (File 1) | A1, B1, C1, D1, E1 |
| (File i) | A1, B2, C3, D3, E2 |

EVENT WHERE F3 AND F4 ARE PUSHED SIMULTANEOUSLY

SET UP DELETE PROCESSING

ELECTRONIC MUSICAL INSTRUMENT HAVING SECONDARY STORAGE OF FILES WITH COMMON CONSTITUENT PORTIONS IDENTIFIED BY ENTRY NAME

This is a continuation of application Ser. No. 07/821,363 filed Jan. 16, 1992, now abandoned.

BACKGROUND OF THE INVENTION

1. Field of the Invention

The present invention relates to an electronic appliance having a secondary storage device and particularly to an electronic appliance, for example, such as an electronic musical instrument, having a secondary storage device for storing data which can be easily divided into pieces under a plurality of predetermined items.

2. Description of the Related Art

Secondary storage devices such as magnetic tapes, floppy disks, hard disks, optical disks, and the like are widely used in electronic appliances such as computers, electronic musical instruments, and the like. Such a secondary storage device has a predetermined storage capacity. When the quantity of data storage has reached this storage capacity, the storage device becomes impossible to store data any more.

When generated or edited data are to be stored into such a secondary storage device through an input-output device of an electronic appliance or the like, all generated data are stored together with affix data such as file names for identifying the data.

In most cases, the portion to be subjected to alteration is partial in the same group of data, such as a program for controlling a certain electronic appliance, so that portions of the same data overlap each other in a plurality of data. In such cases, the constituent portions of the same data have had to be stored wastefully when different file names are affixed to the data are used.

As described above, a document or a file which is an unit of information treated in such a secondary storage device has been heretofore handled as one unit as a whole, so that portions of the document or file have been not noticed when the portions are written in or read out. Accordingly, information which is different only a portion thereof From other information has been stored as a file which is different from another file of the other information, so that the storage capacity of the secondary storage device has been consumed wastefully.

SUMMARY OF THE INVENTION

An object of the present invention is to provide an electronic appliance having a secondary storage device in which in storing information, the same portion as that of already stored information is not newly stored to thereby make it possible to effectively use the storage capacity of the secondary storage device.

Another object of the present invention is to provide an electronic musical instrument in which the storage capacity of a secondary storage can be used effectively.

According to one aspect of the present invention, provided is a method for controlling information for a secondary storage device, in which data to be stored as one file in the secondary storage device is divided into a plurality of constituent portions under predetermined items, file names are affixed respectively to files, and entry names are affixed respectively to the itemized constituent portions. A file to be newly stored is divided into a plurality of constituent portions under the predetermined items and a judgment is made as to whether any of the constituent portions of the new file is the same as any of the already stored constituent portions of the other file with respect to one and the same item, so that the same entry name is affixed to the same constituent portion without storing the contents of the constituent component in duplication so that the same data is used common to a plurality of files.

BRIEF DESCRIPTION OF THE DRAWINGS

Other features and advantages of the present invention will be apparent from the following description taken in connection with the accompanying drawings, wherein:

FIGS. 1A, 1B and 1C are schematic diagrams showing the basic structure of the present invention, in which FIG. 1A shows the case where writing is made, FIG. 1B shows the ease where reading is made, and FIG. 1C shows the ease where deleting is made;

FIGS. 2A through 2D show an embodiment of the present invention, in which FIG. 2A is a block diagram showing the structure of the system, FIG. 2B is a schematic view showing the structure of the data memory, FIG. 2C is a schematic view showing the structure of the management table, and FIG. 2D is a schematic view showing the structure of the file memory;

FIGS. 6A through 6D are schematic views showing the structure of the data management file, in which FIG. 6A shows the whole structure of the same, and FIGS. 6B through 6D show the partial structures of the same;

FIGS. 9A and 9B are flow charts showing a disk operating procedure, in which FIG. 9A shows the disk removal interrupt routine, and FIG. 9B shows the disk insertion interrupt routine.

FIGS. 12A and 12B are flow charts showing the on event routine on a WD screen, in which FIG. 12A shows the F1/F2-on event routine in the case where the cursor is on a numeric character set, and FIG. 12B shows the F1/F2-on event routine in the case where the cursor is on a name character set;

FIGS. 18A and 18B are flow charts showing the event routine on an RD screen, in which FIG. 18A shows the F1/F2-on event routine, and FIG. 18B shows the F3-and-F4 simultaneous touch event routine;

FIGS. 21A and 21B are flow charts showing the processing routine on a DEL screen, in which FIG. 21A shows the F3-and-F4 simultaneous touch event routine and FIG. 21B shows the setup delete routine in the flow chart of FIG. 21A.

DESCRIPTION OF THE PREFERRED EMBODIMENTS

Figure 1A:
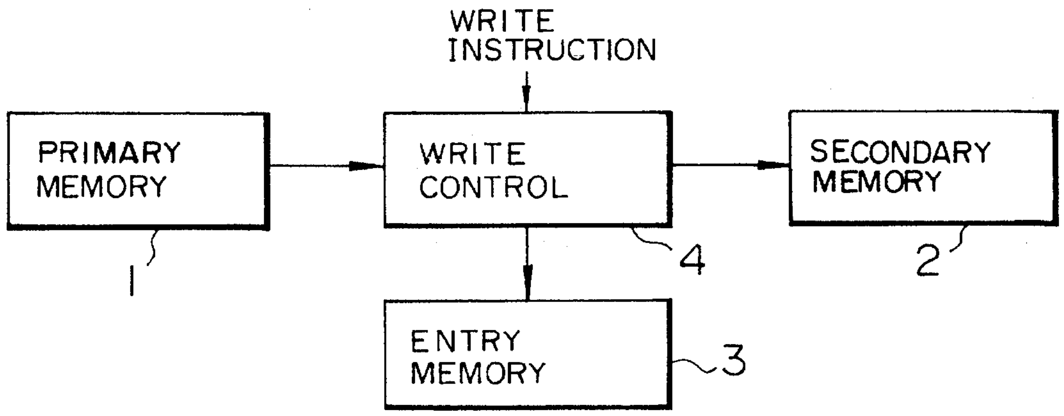

An electronic appliance having a secondary storage device according to a basic embodiment of the present invention will be described hereunder with reference to FIG. 1A. The electronic appliance has: a primary storage device 1 for storing new data divided into constituent portions under a plurality of items; a secondary storage device 2 for storing files each constituted by data divided into constituent portions under a plurality of items; an entry storage device 3 for storing the entry name structure of each file through entry names affixed to the respective itemized constituent portions stored in the secondary storage device 2; and a write control means 4 which operates in a manner so that when new data stored in the primary storage device 1 are to be stored as a file into the secondary storage device 2, the write control means judges whether or not a constituent portion of the new data is the same as that of any of the predetermined items already stored in the secondary storage device 2, so that when the constituent portion of the new data is the same as the constituent portion already stored in the secondary storage device 2, the write control means affixes the same entry name as that of the latter to the former without storing the former into the secondary storage device 2, while when the constituent portion of the new data is not the same as the constituent portion already stored in the secondary storage device 2, the write control means causes the secondary storage device 2 to store the former therein, affixes a new entry name to the former, and causes the entry storage device 3 to store an entry name structure therein.

Figure 1B:
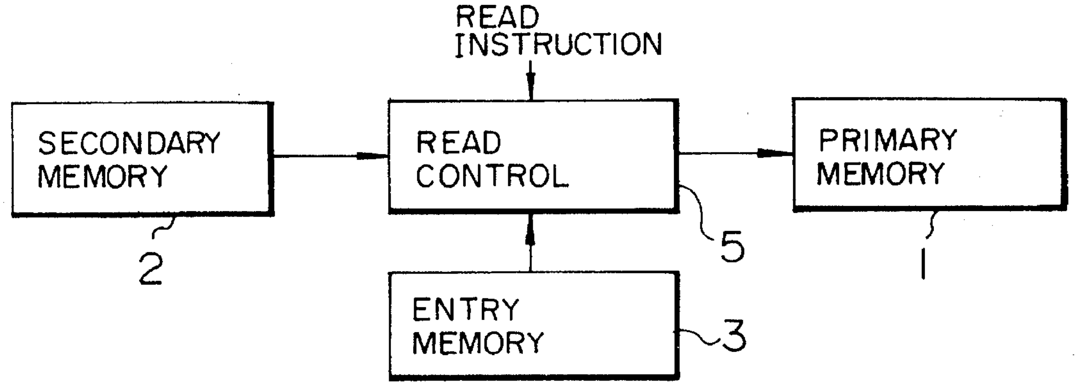

Further, the electronic appliance having a secondary storage device will be described hereunder with reference to FIG. 1B. The electronic appliance has: a secondary storage device 2 for storing data divided into constituent portions under a plurality of predetermined items, the constituent portions being respectively identified by entry names; an entry storage device 3 for storing a predetermined combination of the itemized data stored in the secondary storage device 2 as a file in the form of a structure of entry names; a primary storage device 1 for newly storing the contents of a file; and a read control means 5 for reading the entry name structure of a file from the entry storage device 3 in response to a file reading instruction and then reading data corresponding to the respective entry names of the entry name structure from the secondary storage device 2 to supply the data to the primary storage device 1.

Figure 1C:
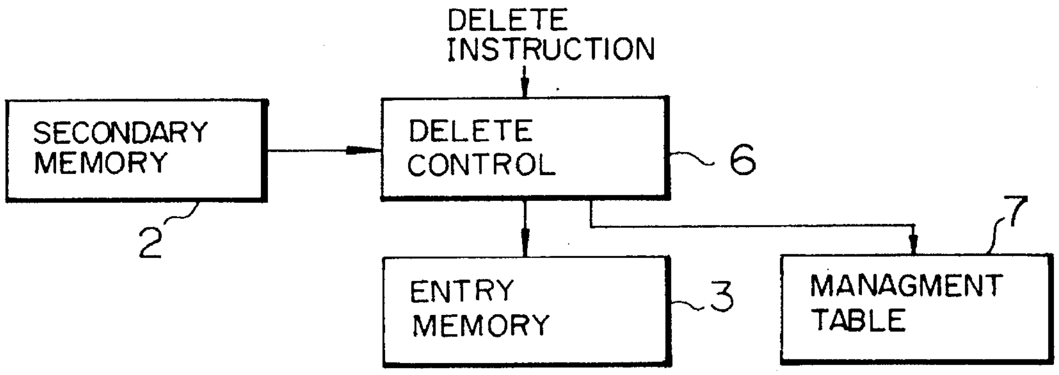

Further, the electronic appliance having a secondary storage device will be described hereunder with reference to FIG. 1C. The electronic appliance has: a secondary storage device 2 for storing data divided into constituent portions under a plurality of predetermined items, the constituent portions being respectively identified by entry names; an entry storage device 3 for storing a predetermined combination of the itemized data stored in the secondary storage device 2 as a file in the form of a structure of entry names; a management table 7 for storing the number of times by which each data constituent portion stored in the secondary storage device is repeatedly used throughout all files; and a delete control means 6 for reading the entry name structure of a file from the entry storage device 3 in response to a file deleting instruction and then not only deleting the entry name structure of the file in the entry storage device 3 while decreasing the number of times stored in the management table but deleting data from the secondary storage device 2 when the number of times reaches zero.

The repetition of storage of the same constituent portion can be avoided by: diving data stored as a file in the secondary storage device into constituent portions under predetermined items; identifying the respective constituent portions by entry names; and storing each file in the form of an entry name structure.

When data divided under items are stored so that the each data can be used through designating the entry name thereof, a combination of the divided data already stored can be identified easily by the entry name structure.

When data writing is made, the quantity of information to be stored can be reduced by: dividing data to be written under predetermined items; judging whether a divided data is the same as the already stored data with respect to the same item; and using the data in common to the same data.

Each file is constituted by a structure of entry names, so that by reading the entry name structure, reading of data used in common to a plurality of files can be preformed properly.

With respect to file deleting, a management system for storing the number of times by which a data constituent portion is repeatedly used throughout all files is used to prevent the deletion of constituent portions used in common to other files. When the number of times reaches zero the data constituent portions can be deleted because the data constituent portions become unnecessary any more.

As described above, the capacity of the secondary storage device can be used effectively for storing information. This invention is particularly effective in the case where information having a formatted pattern is partially changed and then stored.

Figures 2A, 2B, 2C, 2D:
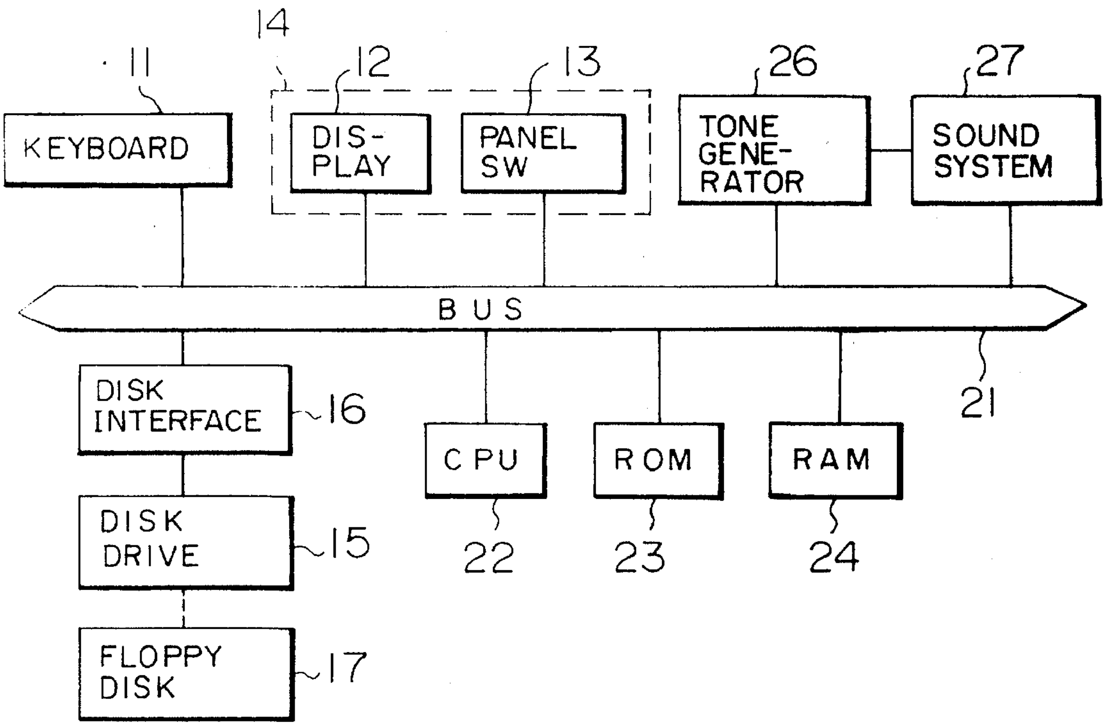

Referring to FIG. 2A, there is shown the system structure of the electronic appliance according to an embodiment of the present invention. An electronic musical instrument taken as an example of the electronic appliance will be described hereunder.

A keyboard 11 having a plurality of keys, a CPU 22 for carrying out an arithmetic operation, an ROM 23 for storing programs and the like, an RAM 24 having work memories such as flags, registers, buffers and the like, an operation panel 14 including a display 12 such as a liquid crystal display and panel switches 13 for controlling performance, tone color and the like, a tone generator 26 for generating tone signals, and so on are connected to a bus 21. When a performance is made through the keyboard 11 after a performance environment is set through the operation panel 14, tone signals are formed by the CPU 22, the ROM 23 and the RAM 24 to thereby generate musical tones from a sound system 27 through the tone generator 26.

In this embodiment, further, a disk drive device 15 is connected to the bus 21 through a disk interface 16. The disk drive device 15 is used with a floppy disk 17 inserted therein.

When performance environment control data or the like edited by using the operation panel 14 including a display 12

It is, therefore, desirable to allow the user to manually cause the desktop computer to enter a power conservation mode, without first having to exit applications, and be able to resume using the applications as though the computer was not turned off.

Typical portable computers have a switch to control the power to the computer and a different switch to implement the suspend/resume function. This can cause user confusion and increases the cost and complexity of portable computers. Thus, it is desirable to provide a desktop computer system with the above power-conservation capability without using a plurality of buttons.

SUMMARY OF THE INVENTION

According to the present invention, one switch is used to control the on/off and suspend/resume functions of the computer system. The computer system is designed with four states: a normal operating state, a standby state, a suspend state, and an off state. One switch is used to change between the off state, the normal operating state, and the suspend state.

The normal operating state of the computer system of the present invention is virtually identical to the normal operating state of any typical desktop computer. Users may use applications and basically treat the computer as any other. One difference is the presence of a power management driver, which runs in the background (in the BIOS and the operating system), transparent to the user. The portion of the power management driver in the operating system (OS) is the Advanced Power Management (APM) advanced programming interface written by Intel and Microsoft, which is now present in most operating systems written to operate on Intel's 80X86 family of processors. The portion of the power management driver in BIOS (APM BIOS) is unique to the present invention and communicates with the APM OS driver. The APM OS driver and the APM BIOS routines together control the computer's transition to and from the other three states.

The second state, the standby state, uses less power than the normal operating state, yet leaves any applications executing as they would otherwise execute. In general, power is conserved in the standby state by placing devices in their respective low-power modes. For example, power is conserved in the standby state by ceasing the revolutions of the fixed disk within the hard drive and by ceasing generating the video signal.

The third state is the suspend state. In the suspend state, computer system consumes an extremely small amount of power. The suspended computer consumes very little power from the wall outlet. The only power consumed is a slight trickle of power to maintain the switch circuitry from a battery inside the computer system (when the system is not plugged into a wall outlet) or a slight trickle of power generated by the power supply (when the system is plugged in).

This small use of power is accomplished by saving the state of the computer system to the fixed disk storage device (the hard drive) before the power supply is turned "off." To enter the suspend state, the computer system interrupts any executing code and transfers control of the computer to the power management driver. The power management driver ascertains the state of the computer system and writes the state of the computer system to the fixed disk storage device. The state of the CPU registers, the CPU cache, the system memory, the system cache, the video registers, the video memory, and the other devices' registers are all written to the fixed disk. The entire state of the system is saved in such a way that it can be restored without the code applications being adversely affected by the interruption. The computer then writes data to the non-volatile CMOS memory indicating that the system was suspended. Lastly, the computer causes the power supply to stop producing power. The entire state of the computer is safely saved to the fixed disk storage device, system power is now "off," and computer is now only receiving a small trickle of regulated power from the power supply to power the switch circuitry.

The fourth and final state is the off state. In this state, the power supply ceases providing regulated power to the computer system, but the state of the computer system has not been saved to the fixed disk. The off state is virtually identical to typical desktop computers being turned off in the usual manner.

Switching from state to state is handled by the power management driver and is typically based on closure events of a single switch, a flag and two timers: the inactivity standby timer and the inactivity suspend timer.

The system has a single power button. This button can be used to turn on the computer system, suspend the state of the system, restore the state of the system, and turn off the system. If the computer is in the normal operating state or the standby state and the user presses the button, the computer will change either to the suspend state or the off state, depending on the value of the flag. If the flag indicates that the system should be suspended when the button is pressed, the system will begin suspending and eventually enter the suspend state. If the flag indicates that the system should merely be turned off when the button is pressed, the computer will merely enter the off state. The flag can be controlled by the user. That is the user can determine whether the system is suspended or turned off when the button is pressed while in the normal operating state. Also, when there is no power management driver on the operating system, the switch will function as a simple on/off switch for the power supply.

If the computer system is in the off state and the power button is pressed, the system will start as it normally would. If the computer system is in the suspend state and the power button is pressed, then the operator is given a choice: either start the system as it normally would, or restore the system to the state it was in when it was suspended. Obviously if the user suspended the system while using applications, the user will probably want to restore the state of the computer system. However, if for some reason the user wants to start the computer anew and lose the suspended system state, the option is present.

The inactivity standby timer and the inactivity suspend timer also effect state changes. Both timers count when there is no user activity, such as keys being pressed on the keyboard, mouse movements, mouse buttons being pressed, or hard file activity. When the inactivity standby timer expires, the system enters the standby state, as outlined above. When the inactivity suspend timer expires, the system enters the suspend state, as outlined above.

Typically, the inactivity suspend timer will be set to a longer period of time than the inactivity standby timer. Therefore, the computer will normally change from the normal operating state to the standby state first. Then after another period of inactivity, the computer system will enter the suspend state. Users of networked systems that cannot tolerate the suspend state can selectively set the inactivity suspend timer to never expire.

Any user activity causes both inactivity timers to reset, thereby preventing the computer from entering either the standby state or the suspend state while the user operates the system.

If the system is in the standby state and user moves the mouse or touches a key on the keyboard, the system leaves the standby state and changes to the normal operating state. In doing so, the video driver begins generating the video signal again and the fixed disk begins spinning again. However, if the system is in the suspend state and the user moves the mouse or touches a key on the keyboard, the system will not automatically change to the normal operating state.

When changing from the suspend state to the normal operating state, the system should restore the state of the computer system in such a way that the applications are unaffected by the interruption. The state of the CPU registers, the CPU cache, the system memory, the system cache, the video registers, and the video memory should all be read from the fixed disk. The entire state of the system should be restored to allow the applications to proceed where they were interrupted.

The use of the suspend/resume allows a great time-savings over merely turning the system off to save power and turning the system back on. Moreover, the single switch simplifies the user interface thereby lessening confusion arising from its use.

These and other advantages of the present invention shall become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

Figure 3:
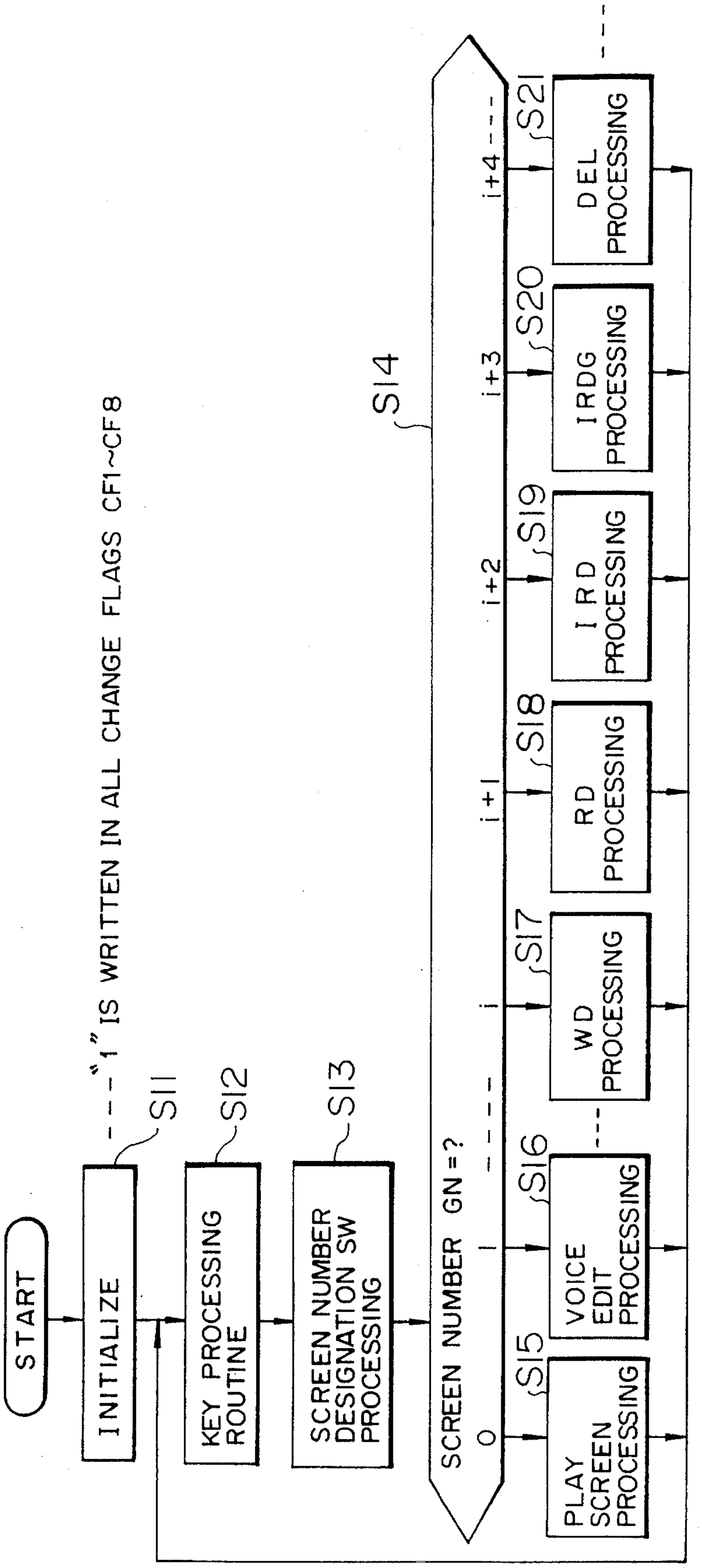
FIG. 3 is a flow chart showing the main routine.
Figure 4:
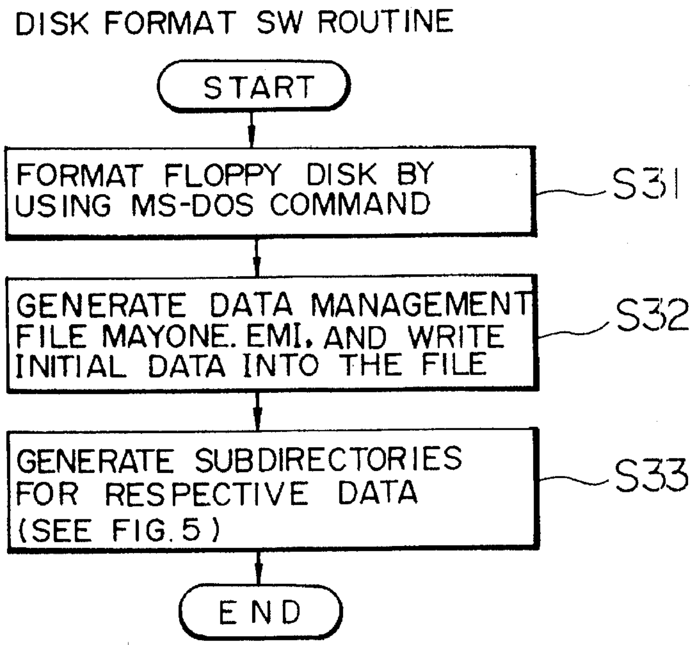
FIG. 4 is a flow chart showing the disk format switch routine.
Figure 5:
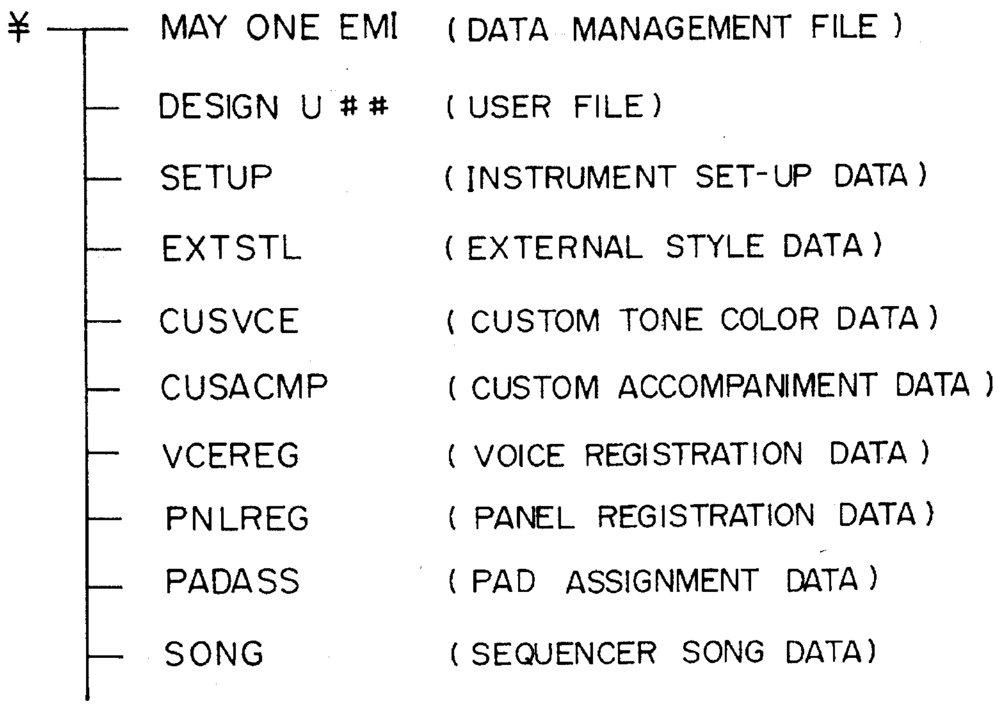
FIG. 5 is a schematic view showing the internal structure of a disk.
Figure 6A:
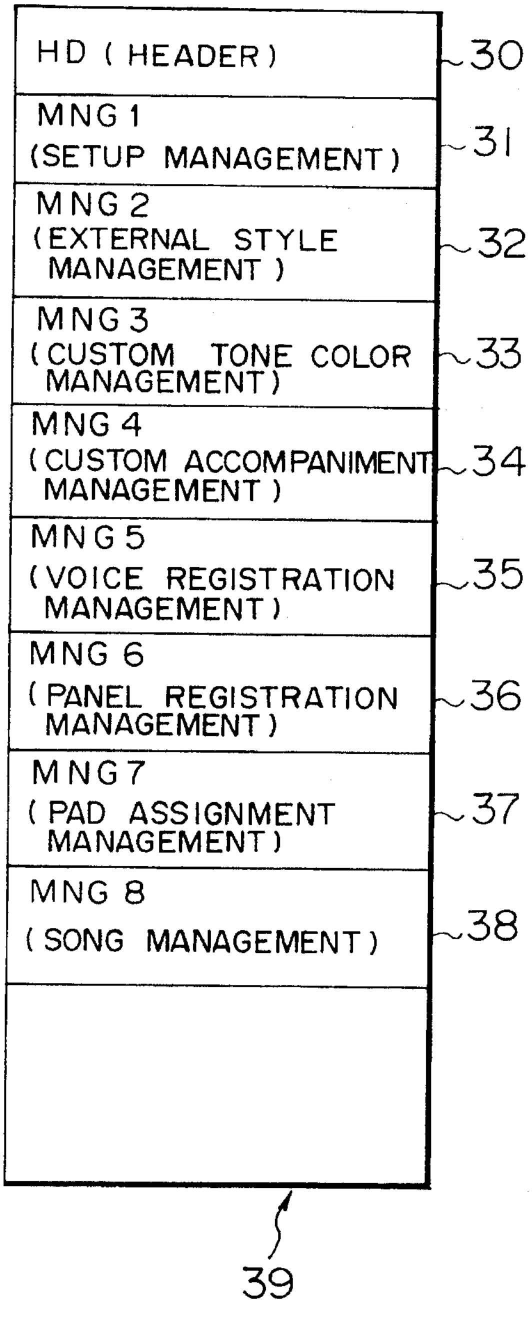
Figure 6B:
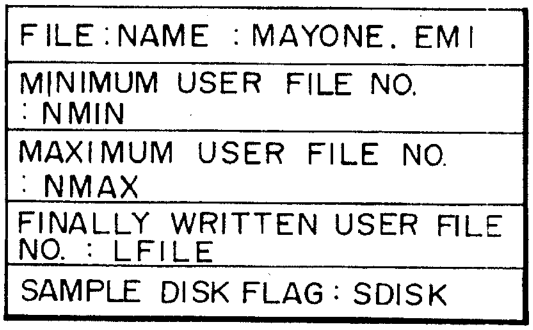
Figure 6C:
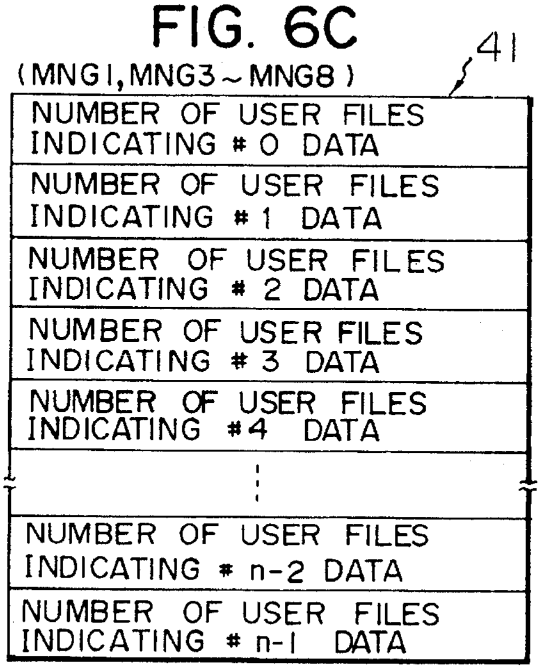
Figure 6D:
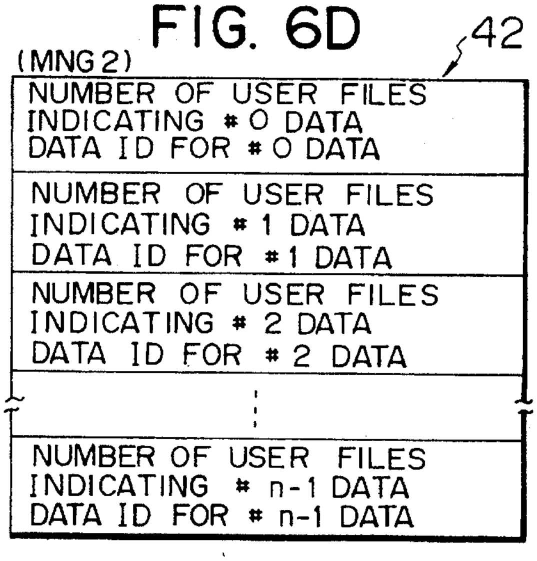
Figure 7:
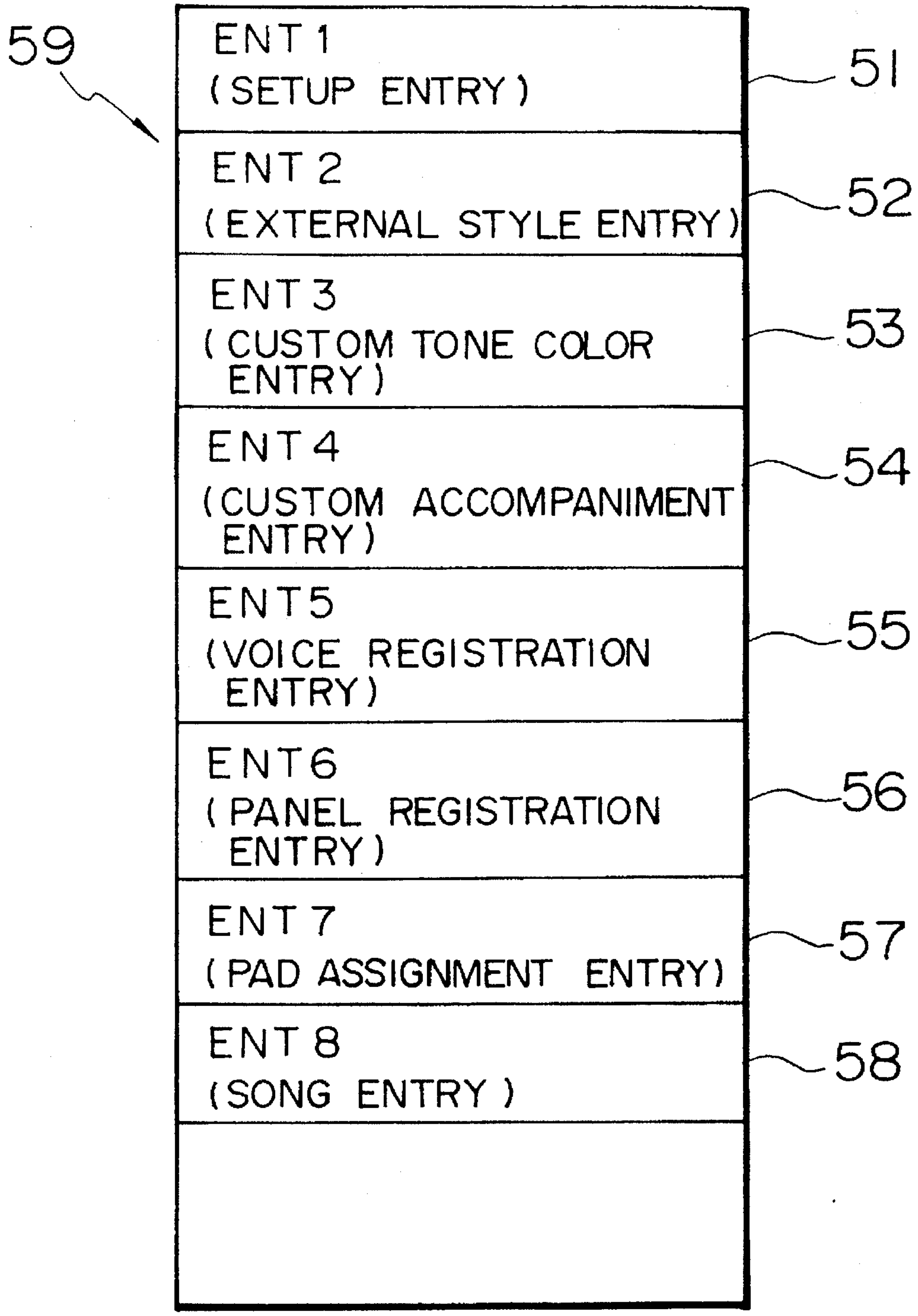
FIG. 7 is a schematic view showing the structure of a user file.
Figure 8:
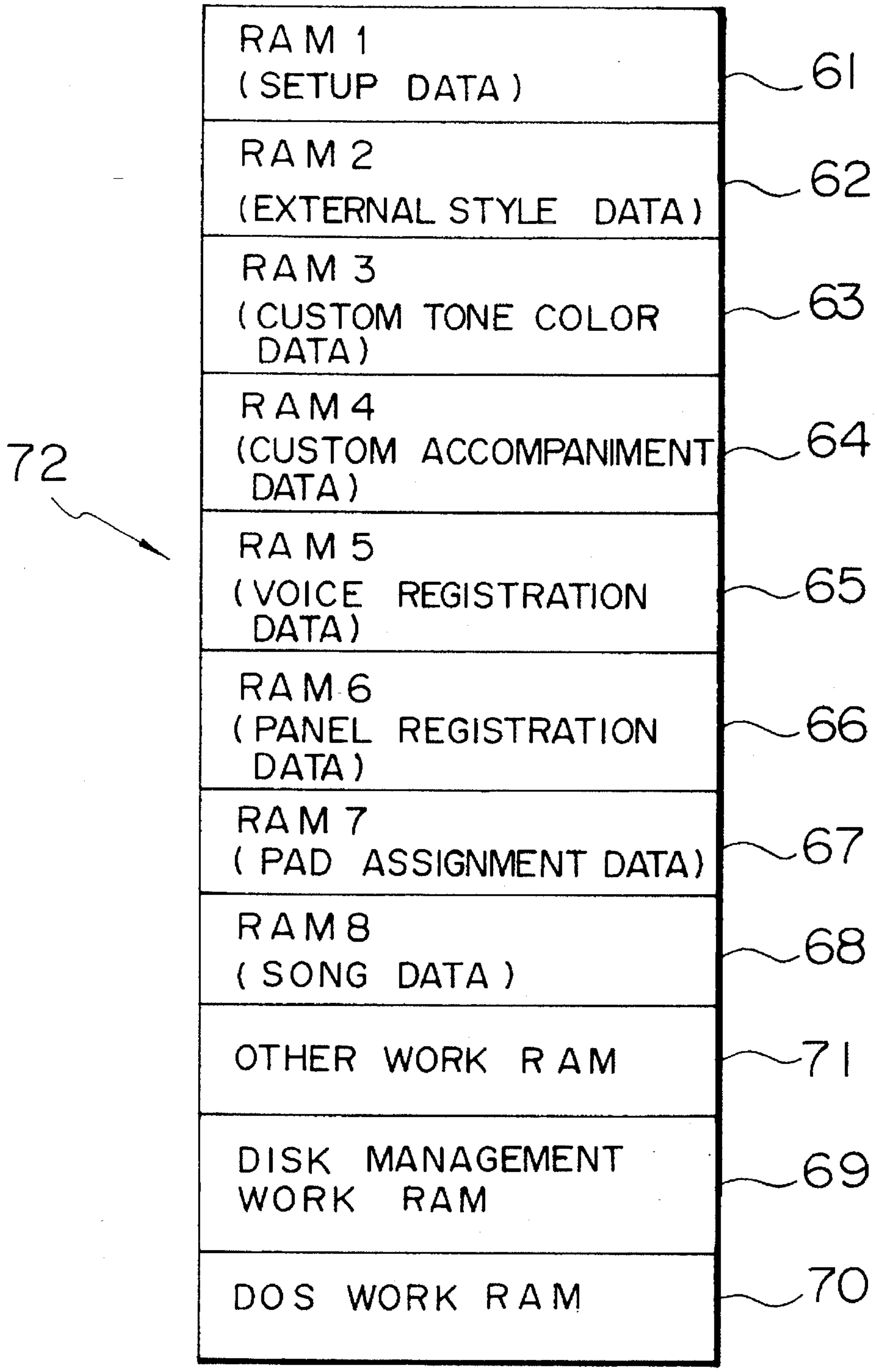
FIG. 8 is a schematic view showing the structure of a system RAM.
Figure 9A:
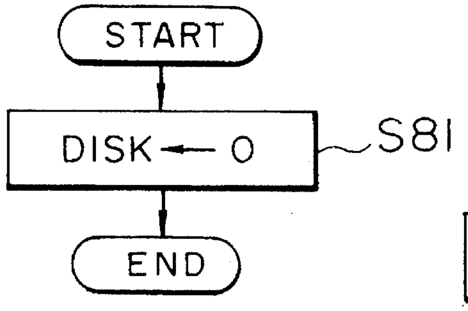
Figure 9B:
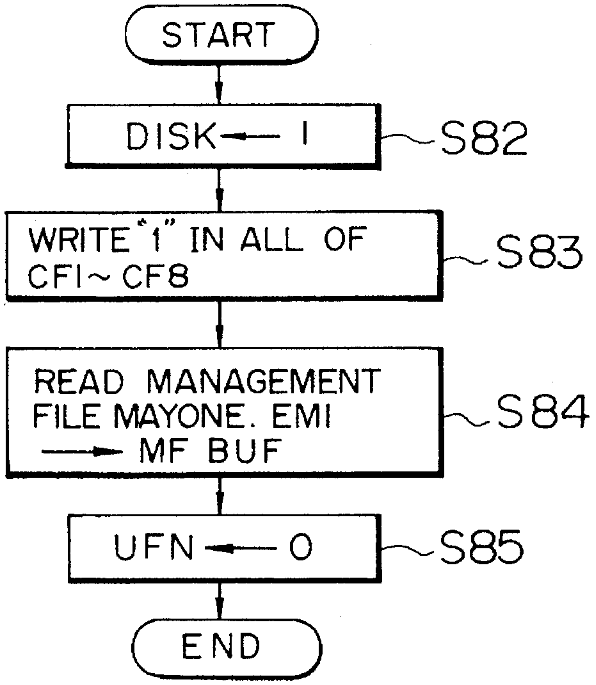
Figure 10:
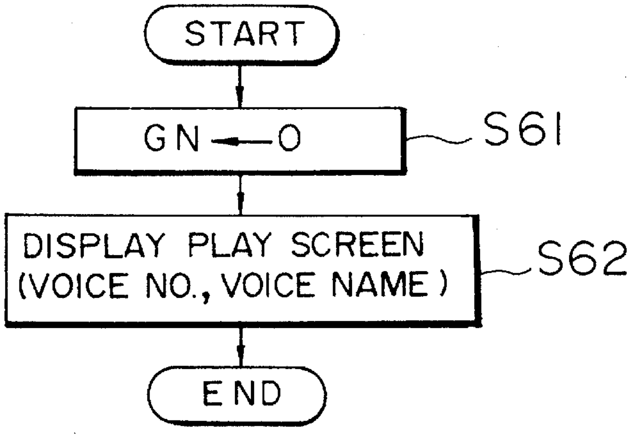
FIG. 10 is a flow chart showing the play-screen switch-on event routine.
Figure 11:
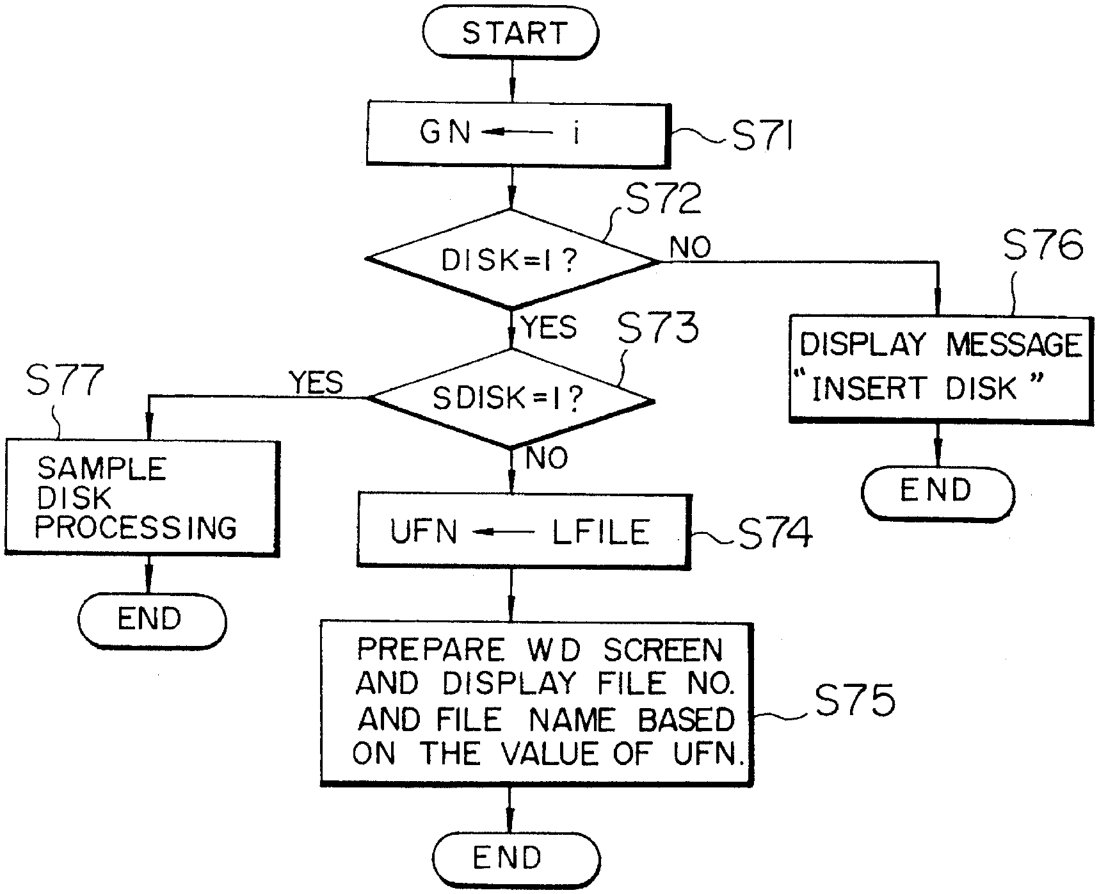
FIG. 11 is a flow chart showing the disk-write-screen switch-on event routine.
Figure 13:
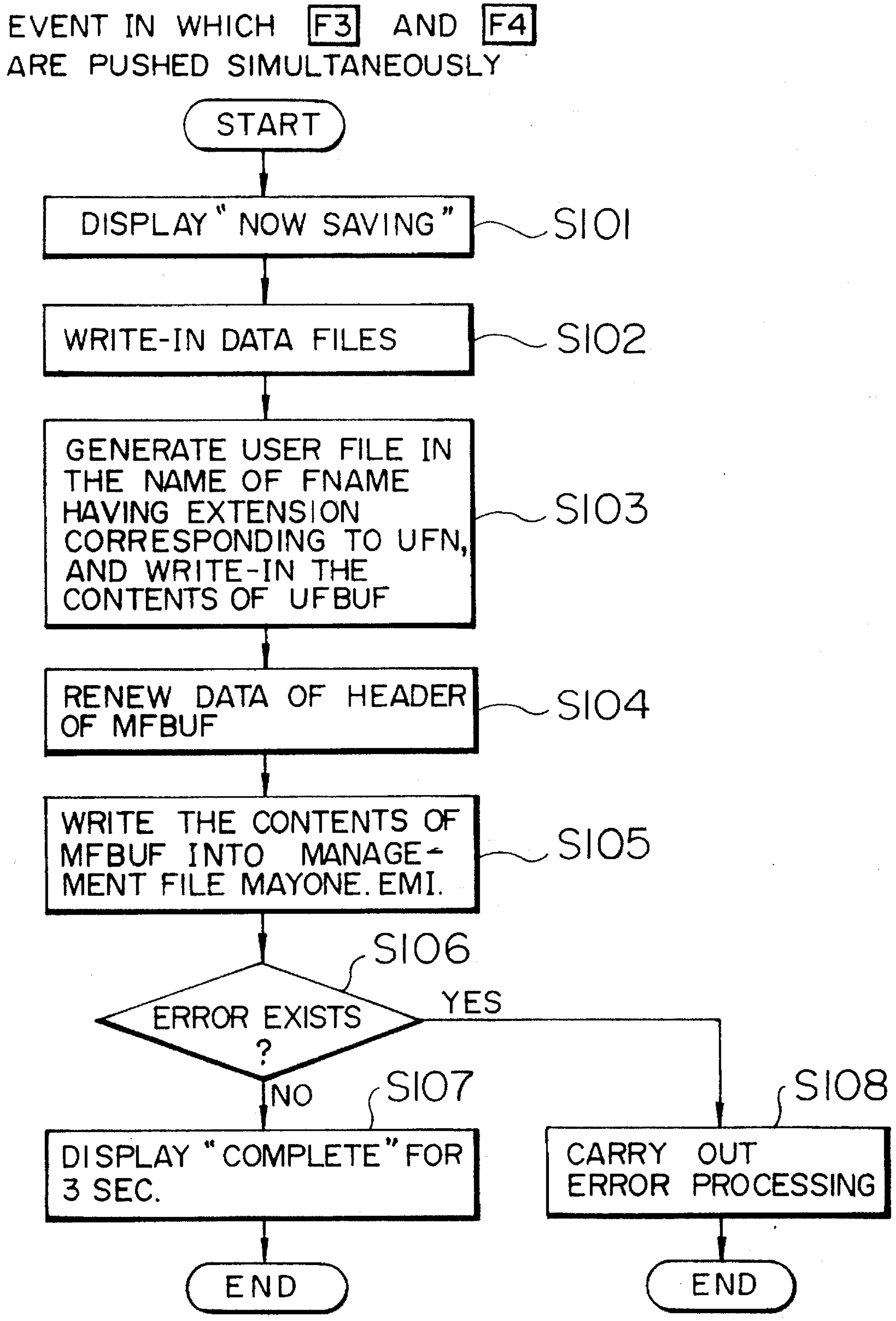
FIG. 13 is a flow chart showing another form of the on event routine on a WD screen.
Figure 14:
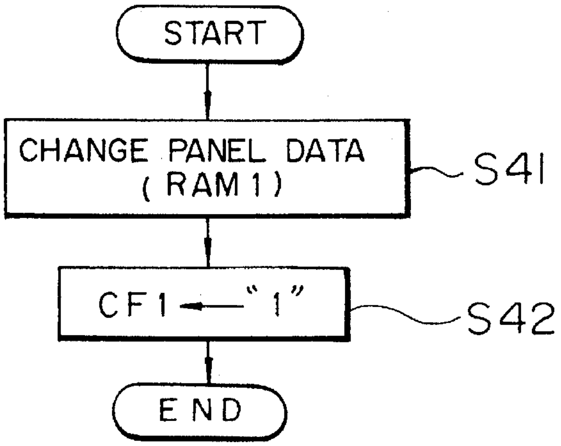
FIG. 14 is a flow chart showing the panel data change routine.
Figure 15:
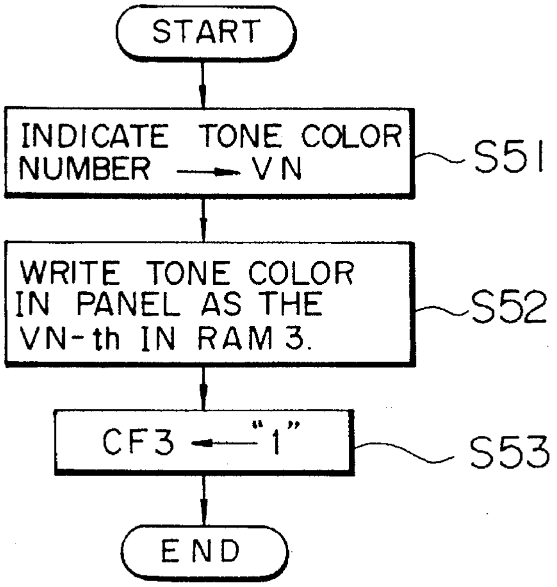
FIG. 15 is a flow chart showing the custom tone color write routine.

FIG. 1 is a perspective view of a personal computer embodying this invention;

FIG. 2 is an exploded perspective view of certain elements of the personal computer of FIG. 1 including a chassis, a cover, an electromechanical direct access storage device and a planar board and illustrating certain relationships among those elements;

FIG. 3 is a block diagram of certain components of the personal computer of FIGS. 1 and 2;

FIG. 4 is a state diagram of the computer system of the present invention, showing the four system states: normal, standby, suspend, and off;

FIG. 5 is a block diagram showing the relevant portions of the power supply;

FIG. 6 is an electrical schematic diagram of the hardware needed to accomplish the single switch suspend/resume functions of the present invention, showing the various interfaces to other Figures;

FIG. 7 is a state diagram of one of the state machines of the programmable array logic (PAL) device U2 shown in FIG. 6;

FIG. 8 is a flow chart showing generally the power-up routine of the present invention;

FIG. 9 is a flow chart showing the details of the Supervisor Routine, which is called by the APM approximately every second;

FIG. 10 is a flow chart showing the details of the Suspend Routine of the present invention;

FIG. 11 is a flow chart showing the details of the Boot-Up Routine of the present invention;

FIG. 12 is a flow chart showing the details of the Resume Routine of the present invention;

FIG. 13 is a flow chart showing the details of the Save CPU State Routine of the present invention;

FIG. 14 is a flow chart showing the details of the Restore CPU State Routine of the present invention; and FIG. 15 is a flow chart showing the details of the Save 8959 State Routine of the present invention.

DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. The present invention deals with the complete design of a computer system, including, but not limited to computer architecture design, digital design, BIOS design, protected mode 80486 code design, application code design, operating system code design, and Advanced Power Management advanced programming interface usage. This application is written for those very familiar with all aspects of computer system design.

Referring now more particularly to the accompanying drawings, a microcomputer system embodying the present invention is there shown and generally indicated at 10 (FIG. 1). As mentioned hereinabove, the computer 10 may have an associated monitor 11, keyboard 12, mouse 13, and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like. As pointed out more fully hereinafter, provisions are made in the planar 20 for the passage of input/output signals to and from the operating components of the microcomputer.

The computer system has a power supply 17 and a power button 21, also hereinafter the switch 21. Unlike in the usual power switch in a typical system, the power button 21 does not switch unregulated line power to and from the power supply 17, as will be explained below. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26

When a disk exists but the disk is not a sample disk, the situation of the routine goes to a step S74. In the step S74, the number LFILE of the finally composed file is stored in the user file number register UFN to prepare the finally composed file having the highest possibility that the file will be written. Then, in a step S75, a writing process screen is prepared. That is, a file number and a file name are presented on the display on the basis of the value of UFN.

The step S74 may be omitted in the reading process. In the cases of the RD process, the IRD process and the DEL process, in a step S75, corresponding screens are prepared. In the IRD process For reading data individually under the respective items, a setup data is preferably prepared as the item of initial values.

Figure 12A:
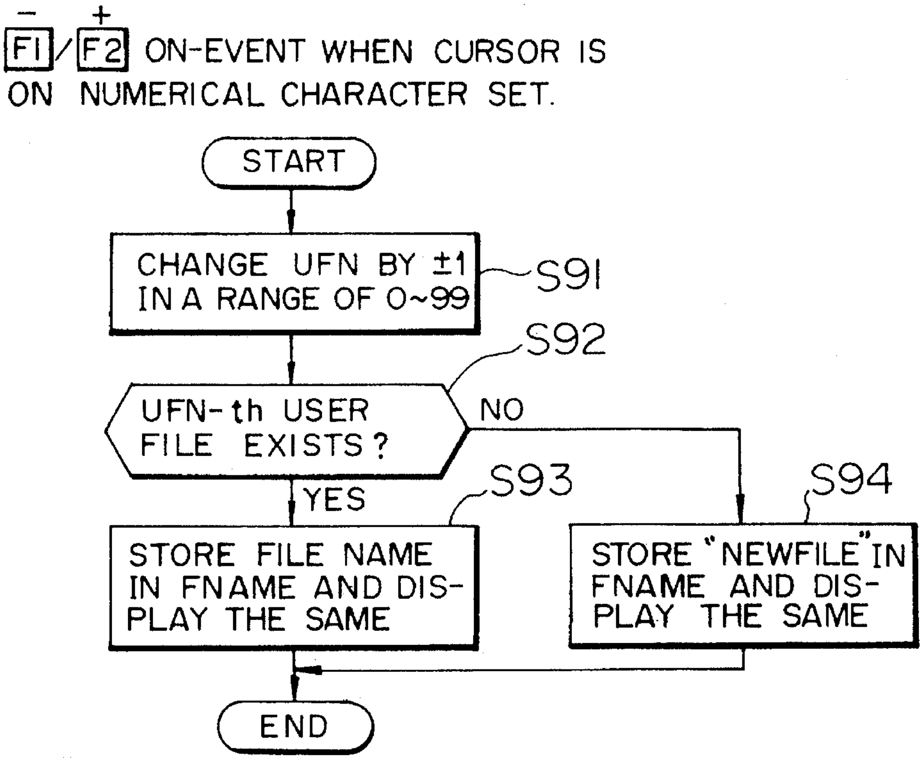
Figure 12B:
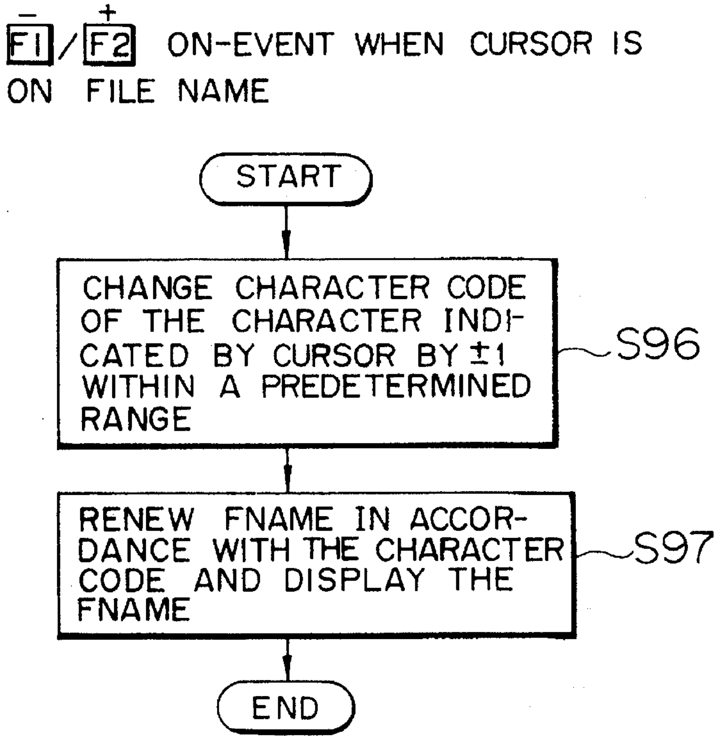

FIGS. 12A and 12B show the on-event routine on the WD screen.

FIG. 12A shows an event in the case where the F1 key expressing a decrement or the F2 key expressing an increment is operated when the cursor is on a numeric character set expressing a file number. The user file number UFN is changed by one (±1) correspondingly to the key operation in a range of 0 to 99 prepared as the file number (in a step S91). Then, in a step S92, a judgment is made as to whether there is any user file corresponding to the user file number UFN. When there is a file, the situation of the routine goes to a step S93. In the step S93, the file name is read and stored in the register FNAME and, at the same time, displayed.

When there is no user file, the situation of the routine goes to a step S94. In the step S94, "NEWFILE" expressing a new file is stored in the file name register FNAME and provided on the display. As a result, writing of a desired file is prepared.

FIG. 12B shows a process in the case where the F1 key expressing a decrement or the F2 key expressing an increment is operated when the cursor is on a file name. First in a step S96, the character code of the character in the position designated by the cursor is changed by one (±1) in a predetermined range to change the file name. Then, in a step S97, the contents of the register FNAME are changed correspondingly to the new file name and, at the same time, the new file name is displayed.

As a result, changing of the file name is perfected.

FIG. 13 shows the other on-event routine on the WD screen. That is, FIG. 13 is a flow chart in the case where execution of writing is designated through pushing the function keys F3 and F4 simultaneously.

In a step S101, "Now Saving" expressing writing is displayed. Then, in a step S102, a process of writing respective data files under the eight items is carried out. In the writing process, a conditional branch procedure is carried out as to whether there is any rewriting of data or not. That is, it is necessary to compose a new data file and rewrite the new data when there is any rewriting of data, but the entry of the data is stored without any rewriting of the data itself when there is no rewriting of data. These preparations are made in this step S102.

Then, in a step S103, a user file having a file name stored in the register FNAME and an extension name corresponding to the file number stored in the register UFN is composed and then data such as an entry and a memory capacity stored in the user file buffer UFBUF are written in the floppy disk.

In a step S104, the data of the header in the management file buffer MFBUF is changed. Then, in a step S105, data stored in the management file buffer MFBUF are written in the management file MAYONE.EMI in the floppy disk. That is, because data such as the minimum file number, the maximum file number, the newest file, etc., can be changed by newly writing, a new management file is composed on the basis of these data.

Then, in a step S106, a judgment is made as to whether there is any error in writing. When there is no error, the situation of the routine goes to a step S107 according to the arrow of "YES". In the step S107, "Complete" expressing the completion of writing is presented on the display for about three seconds. When there is any error, the situation of the routine goes to a step S108 to carry out an error process.

As described above, writing of data with respect to the eighth items is perfected.

In the case where the number UFN of the user file to be written is already filled with the number of a user file, the contents of the user file are read into the buffer UFBUF and then the number of times by which the data of the management file MFBUF is repeatedly used is decreased by one because the user file is deleted. When the number of times reaches zero, a process of deleting the data is carried out.

The writing operation will be described hereunder more in detail.

FIG. 14 shows the routine in the case where data changing is made through the panel before the writing operation is carried out. The case where a setup data is changed will be described as an example.

When the panel data is to be changed while the setup data is edited, in a step S41, the panel data is changed to change data of a corresponding RAM area. Then in a step S42, the flag CF1 indicating data changing is changed to "1". The fact that the data has been changed is indicated by this flag "1".

FIG. 15 shows the routine in the case where custom tone color is written.

In a step S51, when a tone color number is designated, the tone color number is stored in the tone color number register VN. Then, in a step S52, the tone color in the panel is written as the VN-th tone color in the RAM 3. Then, in a step S53, "1" is stored the flag CF3 indicating the change of custom tone color data.

With respect to another item, "1" is stored in a corresponding flag CF in the same manner as described above to indicate the fact that data changing occurs, when data changing occurs in the period of data editing.

Figure 16:
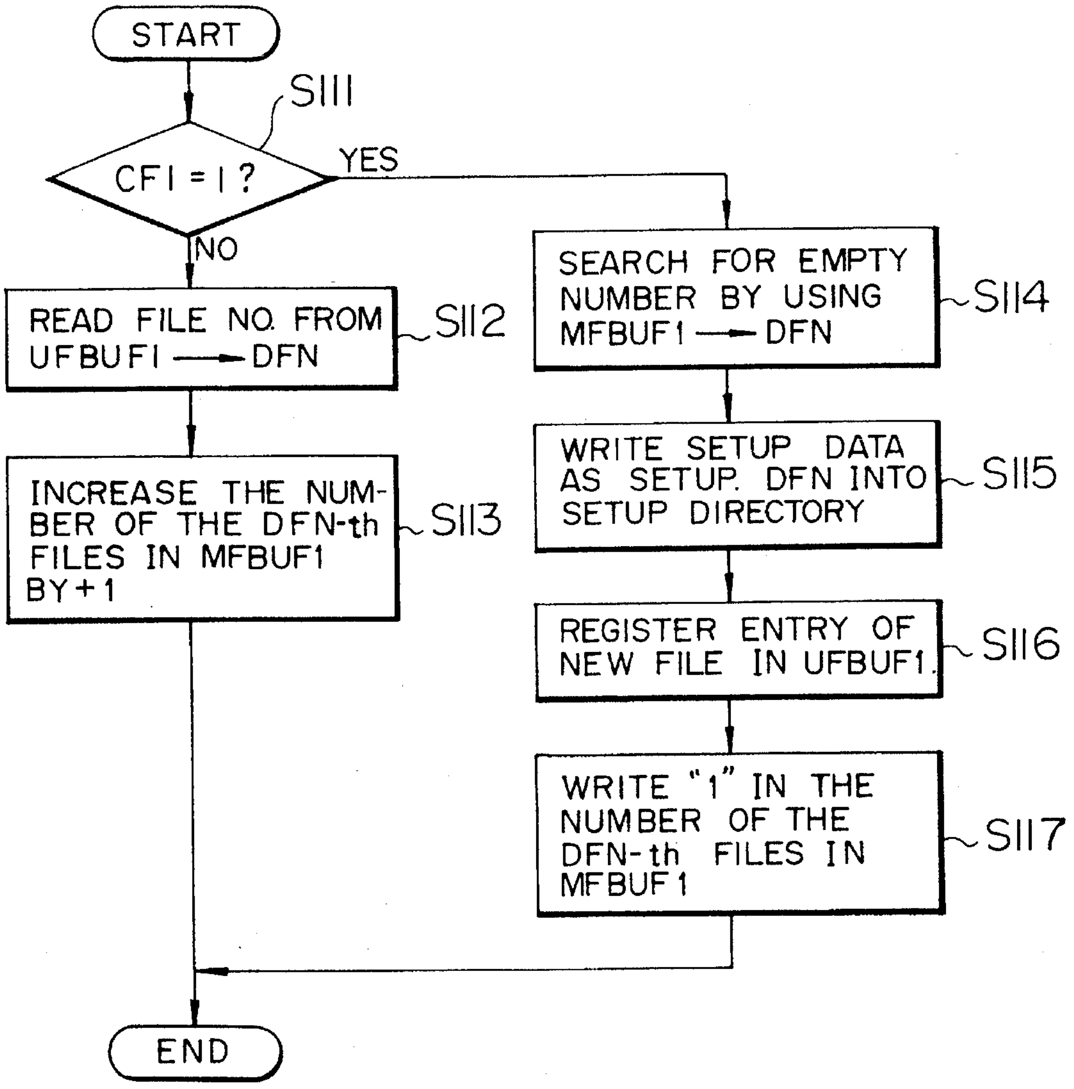
FIG. 16 is a flow chart showing the setup write routine.

FIG. 16 shows the setup write process routine. First in a step S111, a judgment is made as to whether the flag CF1 is 1 or not. That is, the fact that there is any data change is indicated by the value "1" of the flag CF1 and the fact that there is no data change is indicated by the value "0" of the flag CF1. Because the data to be written already exists in the floppy disk when there is no change, writing of data is not made.

When there is no change, the situation of the routine goes to a step S112 according to the arrow of "NO". In the step S112, the file number is read from the user file buffer UFBUF1 and stored in the register DFN. Then, in a step S113, the number of files stored in the DFN-th order in the management file buffer MFBUF1 is increased by one to record the fact that the number of files using the data is increased by one.

In the case where the number of files is decreased by one by overwriting, the number of corresponding files in the management file buffer is decreased by one. When for example, the setup data in the user file U01 is changed from 3 to 4, the number of times of use of the management file for the setup data 3 is decreased by one and, at the same time, the number of times of use of the management file for the setup data 4 is increased by one.

When there is any change and the flag CF1 is "1", the situation of the routine goes to a step S114 according to the arrow of "YES". First any empty number is searched for by using the management file buffer MFBUF1. That is, positions in which the number of files used is zero are searched in ascending order or in descending order. The number obtained by searching is stored in the register DFN.

Then, in a step S115, a new setup data is written as SETUP.DFN in the setup data directory. In a step S116, a new file data entry is registered in the user file buffer UFBUF1. In a step S117, "1" is written in the number of files stored in the DFN-th order in the management file buffer MFBUF. That is, it indicates the fact that the number of files using this data is 1.

When a file using the same data is written in an after-process, the number of files in the DFN-th order is increased by one. Not only the entry number DFN but the file capacity are preferably registered in the user file so that the reading end position can be found at the time of reading.

Figure 17:
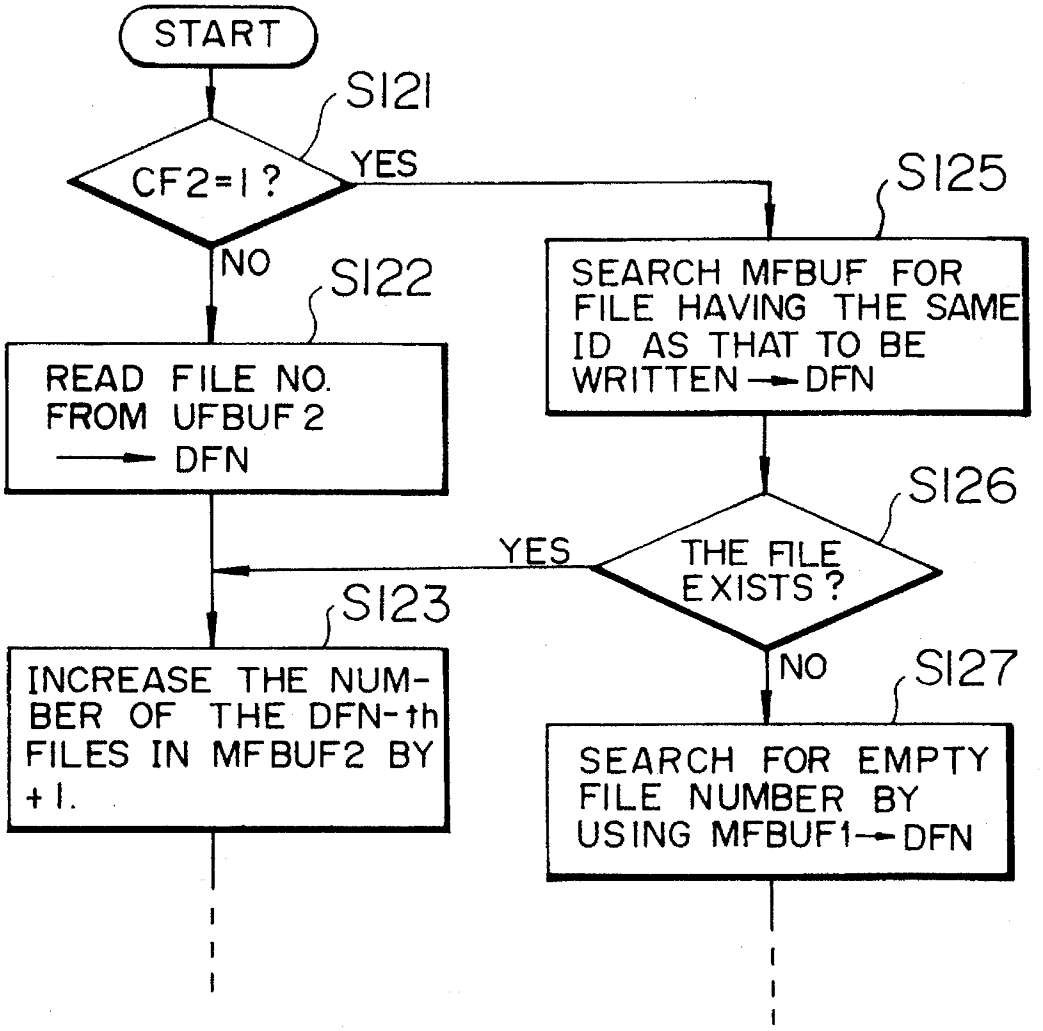
FIG. 17 is a flow chart showing the external style write routine.

FIG. 17 shows the external style write process routine. The external style data is generated in the factory of the maker and has a predetermined data number (DATAID). Accordingly, the difference between data can be found by using the data ID. When the routine starts in a step S121, a judgment is made as to whether the flag CF2 is 1 or not. When CF2 is 1, the fact that there is any change of data is indicated. When CF2 is 0, the fact that there is no change is indicated.

When there is no change, the situation goes to a step S122. In the step S122, the file number is read from the user file buffer UFBUF2 and stored in the register DFN. Then, in a step S123, the number of files in the DFN-th order in the management file buffer MFBUF2 is increased by one. That is, the fact that the number of files using this data is increased by one is stored.

When there is any change, the situation of the routine goes to a step S125. In the step S125, a file having the same ID as that to be written is searched for From the management file buffer MFBUF, so that a corresponding file number is stored in the register DFN. Then, in a step S126, a judgment is made as to whether there is any matched file in the floppy disk. When there is any matched file, the situation of the routine goes to the step S123. When there is no matched data, the situation of the routine goes to a step S127. In the step S127, an empty file number is searched for by using the management file buffer MFBUF1, so that the number is stored in the register DFN. Thereafter, the same procedure as the setup writing process routine is carried out.

Figure 18A:
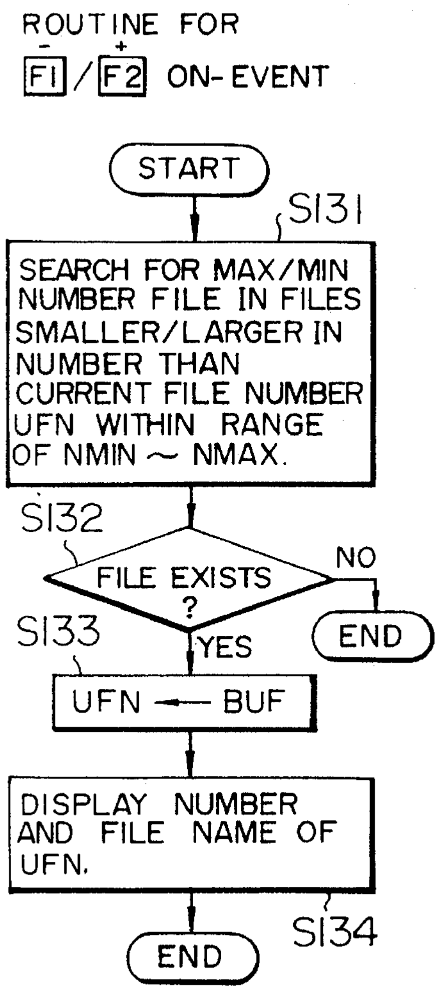
Figure 18B:
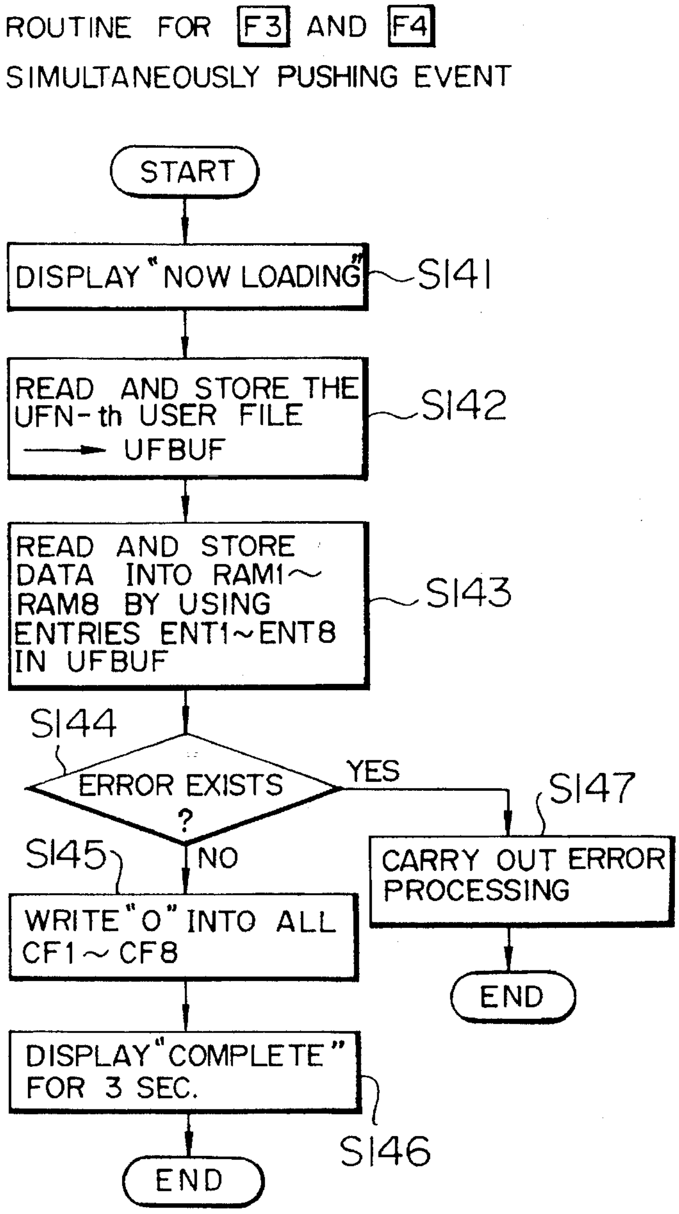

FIGS. 18A and 18B show the respective event routine on the RD screen in a collective reading mode.

FIG. 18A shows time processing routine in the case where the function key F1 expressing a decrement or the function key F2 expressing an increment is operated on the reading screen. In a step S131, the maximum or minimum number file (that is, an adjacent file) in files having a smaller or larger number than the current file number is searched for in a range of from the minimum file number NMIN to the maximum file number NMAX in response to the on event of F1 or F2 and stored in the buffer BUF. When there is no matched file, a numerical character not actually used is stored in the buffer BUF.

Then, in a step S132, a judgment is made as to whether there is any file designated by the file number. When there is no file, the routine is terminated here. When there is any file, the situation of the routine goes to a step S133. In the step S133, the number of the register BUF is stored as the current file number in the register UFN. Then, in a step S134, the number of the register UFN and a corresponding file name are displayed. As described above, preparation for reading data is made.

FIG. 18B shows the processing routine in the case where the function keys F3 and F4 are pushed simultaneously on the reading (RD) screen to instruct execution of reading. First in a step S141, "Now Loading" expressing reading is displayed. Then, in a step S142, the UFN-th order user file corresponding to the user file number UFN is read and stored in the user file buffer UFBUF. Here, entries for constituting the file are written in the buffer. Then, in a step S143, data are read into the memory areas RAM1 to RAM8 by using the entries ENT1 to ENT8 in the register UFBUF. Then, in a step S144 a judgment is made as to whether there is any error in reading. When there is no error in reading, the situation of the routine goes to a step S145 according to the arrow of "YES". In the step S145, data of "0" are respectively written in the flags CF1 to CF8. That is, in this state, data written in the RAM are the same as data in the floppy disk. Then, the situation of the routine goes to a step S146. In the step S146, "Complete" expressing the completion of reading is provided on the display for three seconds. The reading process is thus terminated.

When there is any error in reading the situation of the routine goes to a step S147 according to the arrow of "NO" from the step S144. In the step S147 an error process is carried out.

The event routine on the IRD screen for reading data individually under each item will be described hereunder.

When the function key F1 expressing a decrement or the Function key F2 expressing an increment is operated on the screen, an adjacent file is searched for and displayed in the same manner as in the process on the RD screen shown in FIG. 18A.

When the next page switch is pushed on the IRD screen, the screen is changed to the IRDG screen. When the next page switch is pushed on the IRDG screen, the screen is returned to the IRD screen. Further, selection of a data item is made on the IRD screen. The data item is changed by operating the function key F3 (–) or F4 (+).

Figure 19:
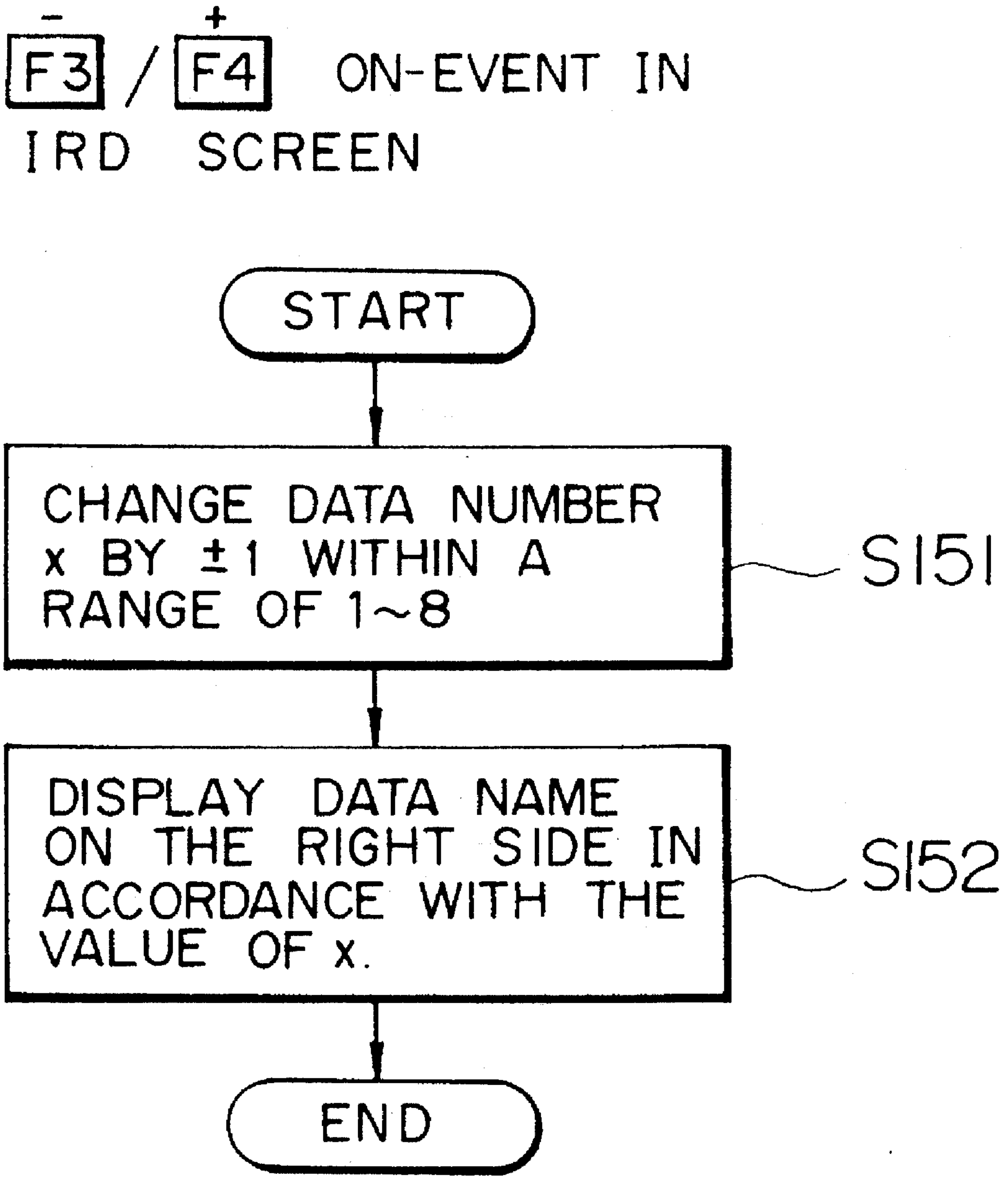
FIG. 19 is a flow chart showing the F3/F4-on event routine on an IRD screen.

The process in the case where one of these function keys F3 and F4 is operated is shown in FIG. 19. It is now assumed that the first data item given to the IRD screen is SETUP(i).

When one of the Function keys F3 and F4 is operated, the data number x is changed in a range of 1 to 8 (in a step S151). Then, a data name corresponding to the value of x is displayed on the right side of the screen.

The process on the IRDG screen for executing reading of individual data will be described hereunder. On the IRDG screen, the function keys F1 and F2 have no Function. That is, reading of data with respect to a single item is executed by the F3-and-F4 simultaneous pushing event.

Figure 20:
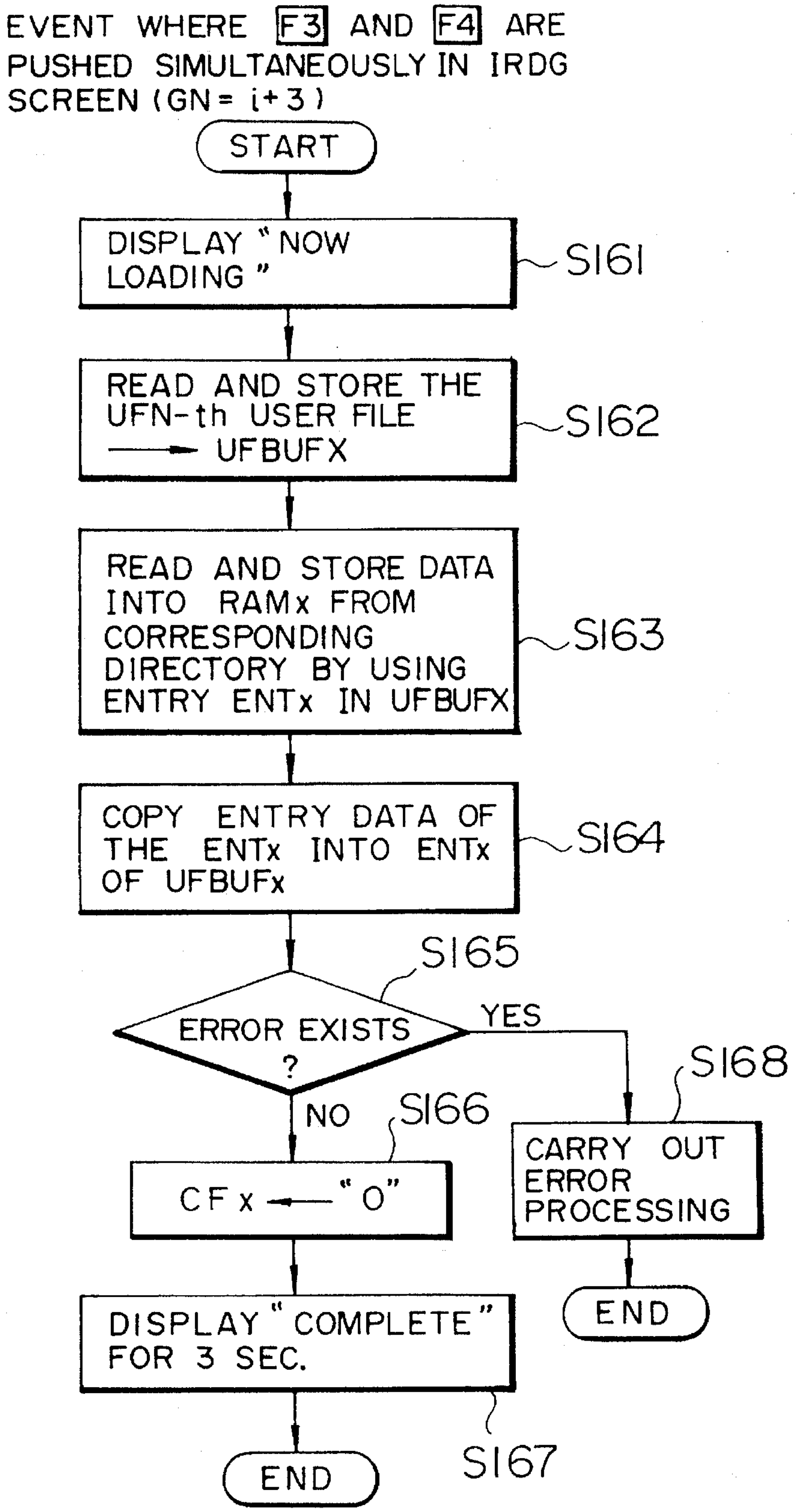
FIG. 20 is a flow chart showing the F3-and-F4 simultaneous touch event routine on an IRDG screen.

FIG. 20 shows the event routine in the case where the function keys F3 and F4 on the IRDG screen are simultaneously pushed. When the routine starts, in a step S161, "Now Loading" expressing reading is displayed. Then, in a step S162, the UFN-th user file corresponding to the user file number UFN is read and stored in the user file buffer UFBUFX.

Then, in a step S163, data are read from a directory corresponding to the entry ENTx in the user file buffer UFBUFX and stored in the memory area RAMx. In a step S164, data in the entry ENTx is copied to ENTx in UFBUFX. Then, in a step S165, a judgment is made as to whether there is any error in reading. When there is no error, the situation of the routine goes to a step S166. In the step S166, "0" is stored in the flag CFx to indicate the fact that data in the body of the instrument are the same as data in the floppy disk. Then, in a step S167, "Complete" expressing the completion of reading is displayed for about three seconds. When there is any error, the situation of the routine goes to a step S168 to carry out an error process.

The process on the deleting (DEL) screen will be described hereunder. The function keys F1 and F2 on the DEL screen respectively instruct the decrease of the data number and the increase thereof in the same manner as the function keys F1 and F2 on the RD screen.

Figure 21A:
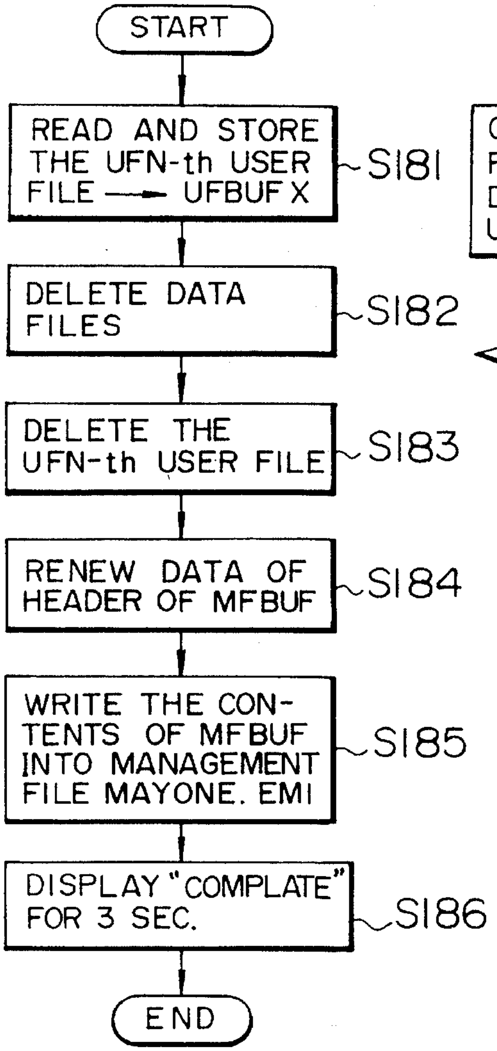

FIG. 21A shows the routine for carrying out the deletion of a file through pushing the function keys F3 and F4 simultaneously on the DEL screen. When the routine starts in a step S181, the UFN-th user file corresponding to the user file number UFN is read and stored in the buffer UFBUFX. Then, in a step S182, data under each item are subjected to a deletion process. The deletion process is a process of changing the data management file by a deleting procedure without directly deleting the data itself. When there is no file using the data, a deleting procedure is carried out for the data.

Figure 21B:
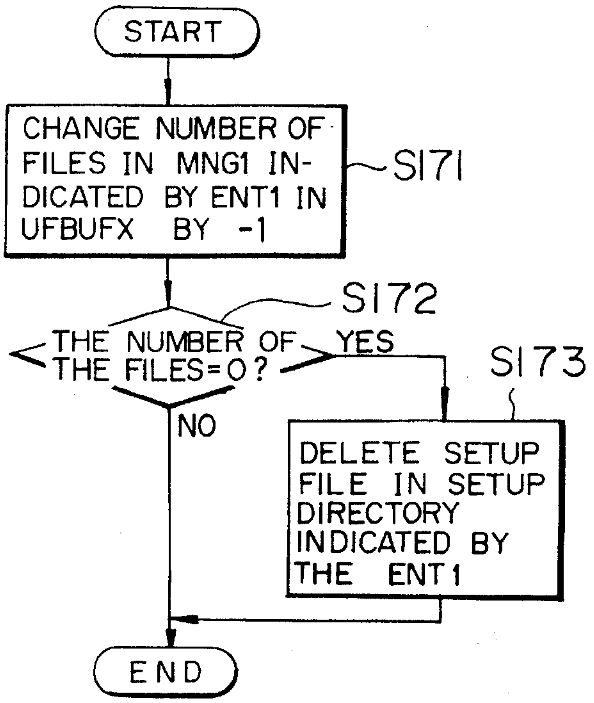

The setup data deleting routine is shown in FIG. 21B as an example. In a step S171, the number of files in the management file MNG1 with respect to the data given by the entry ENT1 in the buffer UFBUFX is decreased by one. Then, in a step S172, a judgment is made as to whether the number of files using the data reaches zero. When the number of files is not zero, the routine is terminated here. When the number of files reaches zero, the situation of the routine goes to a step S173 according to the arrow of "YES". In the step S173, the setup file in the setup directory corresponding to the entry ENT1 is deleted. That is, only disused data is deleted. The same procedure is applied to files with respect to other items.

Referring to FIG. 21A, in a step S183, the UFN-th user file corresponding to the user file number UFN is deleted. In a step S184, data in the header of the management file buffer MFBUF are changed. For example, the maximum value (NMAX), the minimum value (NMIN), etc., may be changed.

Then, in a step S185, the contents of the management file MFBUF are written in the management file MAYONE.EMI in the floppy disk. Because the deleting procedure is completed here, in the next step S186, "Complete" expressing the completion of deletion is displayed for about three seconds.

As described above, the deleting procedure is carried out by changing the management file and the data file if necessary.

Although the present invention has been described as to the embodiments thereof, the present invention is not limited to these embodiments. For example, the management table need not be used if a storage disk capable of being subjected to writing by only once is used for storing data. Accordingly, in this case, the deleting procedure is not required. Even in this case, writing of data can be made while using the capacity of the disk effectively. The entries in the data memory may be given easily by a data sequence in the memory or entry names may be given individually. Although above description has been made upon the case where all files have one information set with respect to the same item, the present invention can be applied to the case where files are formed by arbitrary items among a large number of items.

What is claimed is:

1. An electronic musical instrument comprising:

a primary storage device for storing a data file for the electronic musical instrument, the data file being divided into constituent data portions representing various functions or types of control data used by the electronic musical instrument;

a secondary storage device for storing a plurality of data files each containing a group of data used or produced by the electronic musical instrument, the secondary storage device including:

a file data storage section for storing the constituent data portions that are formed by dividing the group of data in each of the plurality of data files, each of the constituent data portions being identified by entry names, a file entry storage section for storing, for each data file, a plurality of entry names identifying the constituent data portions constituting the group of data that forms each data file of the plurality of data files, and an entry management storage section for storing, for each entry name, a number of times that each constituent data portion is used by the plurality of data files, the number of times being used to determine if particular constituent data portions should be written or stored in the file data storage section or deleted when none of the plurality of data files uses the particular constituent data portions, such that only constituent data portions used by at least one of the plurality of data files are stored in the file data storage section of the secondary storage device to thereby minimize the amount of storage space used in the secondary storage device; and a write control means for making a determination, upon storage of the group of data forming the data file in the secondary storage device, whether any of the constituent data portions are the same as any of the already stored constituent data portions in the secondary storage device, so that when a particular constituent data portion of the constituent data portions is the same as another already stored constituent data portion in the secondary storage device, the write control means uses the same entry name as that of the another already stored constituent data portion for the particular constituent data portion of the data file without causing the secondary storage device to store the particular constituent data portion of the data file, while when the particular constituent data portion of the data file is different from any of the already stored constituent data portions in the secondary storage device, the write control means causes the secondary storage device to store the particular constituent data portion of the data file, and at the same time the write control means uses a new entry name that is different from any of the other entry names of the already stored constituent data portions for the particular constituent data portion of the data file and causes the entry storage section to store an entry name structure with respect to each new entry name.

2. An electronic musical instrument comprising:

a secondary storage device for storing a plurality of files each containing a group of data used or produced by the electronic musical instrument, the secondary storage device including:

a file data storage section for storing constituent data portions that are formed by dividing the group of data in each of the plurality of files, the constituent data portions representing various functions or types of control data that are used by the electronic musical instrument, and each of the constituent data portions being identified by entry names, a file entry storage section for storing, for each file, a plurality of entry names identifying the constituent data portions constituting the group of data that forms each file of the plurality of files, and an entry management storage section for storing, for each entry name, a number of times that each constituent data portion is used by the plurality of files, the number of times being used to determine if particular constituent data portions should be written or stored in the file data storage section or deleted when none of the plurality of files uses the particular constituent data portions, such that only constituent data portions included in at least one of the plurality of files are stored in the file data storage section to thereby minimize the amount of storage space used in the secondary storage device; and file reading instruction generating means for generating a reading instruction to read a designated file; and a read control means for reading the entry names of the designated file from the entry storage section in response to the reading instruction, and for reading the constituent data portions corresponding to the respective entry names from the secondary storage device.

3. An electronic musical instrument comprising:

a secondary storage device for storing a plurality of files each containing a group of data used or produced by the electronic musical instrument, the secondary storage device including:

a file data storage section for storing constituent data portions that are formed by dividing the group of data in each of the plurality of files, the constituent data portions representing various functions or types of control data that are used by the electronic musical instrument, and each of the constituent data portions being identified by entry names, a file entry storage section for storing, for each file, a plurality of entry names identifying the constituent data portions constituting the group of data that forms each file of the plurality of files, and an entry management storage section for storing, for each entry name, a number of times that each constituent data portion is used by the plurality of files, the number of times being used to determine if particular constituent data portions should be written or stored in the file data storage section or deleted when none of the plurality of files uses the particular constituent data portions, such that only constituent data portions included in at least one of the plurality of files are stored in the file data storage section to thereby minimize the amount of storage space used in the secondary storage device; and a delete control means which operates, upon receipt of an instruction to delete a given file, to read the entry names of the given file from the entry storage section of the secondary storage device to decrease the corresponding number of times stored in the entry management section, and to delete a constituent data portion from the secondary storage device when the number of times for that constituent data portion becomes zero.

4. A secondary storage device for storing a plurality of files each containing a group of data used or produced by an electronic musical instrument, the secondary storage device comprising:

a file data storage section for storing constituent data portions that are formed by dividing the group of data in each of the plurality of files, the constituent data portions representing various functions or types of control data that are used by the electronic musical instrument, and each of the constituent data portions being identified by entry names;

a file entry storage section for storing, for each file, a plurality of entry names identifying the constituent data portions constituting the group of data that forms each file of the plurality of files; and an entry management storage section for storing, for each entry name, a number of times that each constituent data portion is used by the plurality of files, the number of times being used to determine if particular constituent data portions should be written or stored in the file data storage section or deleted when none of the plurality of files uses the particular constituent data portions, such that only constituent data portions included in at least one of the plurality of files are stored in the file data storage section to thereby minimize the amount of storage space used in the secondary storage device.

5. A secondary storage device according to claim 4, wherein the group of data in the files is automatic performance data, each group of data in the file being divided into the constituent data portions representing various categories of performance data, and in which a different one of a plurality of entry names is used for each of the constituent data portions, and wherein the entry management section of the secondary storage device includes a management table for storing the number of times each of the plurality of entry names is repeatedly used throughout all of the plurality of files in which the performance data is stored.

6. A secondary storage device according to claim 4, wherein the secondary device further includes a floppy disk for storing the data files, the constituent data portions, and the entry names.

7. A secondary storage device according to claim 4, wherein the entry names also designate directories and subdirectories containing the constituent data portions.

8. A method of storing information in a secondary storage device for an electronic musical instrument, the method comprising the steps of:

dividing the information into a plurality of constituent data portions, the constituent data portions representing various functions or types of control data that are used by the electronic musical instrument;

identifying each constituent data portion with an entry name;

storing the information in the secondary storage device as a file among a plurality of files, the file being formed as a list of entry names identifying the corresponding constituent data portions that make up the information;

storing a number of times each constituent data portion is used in the plurality of files that are stored in the secondary storage device; and deleting all constituent data portions from the secondary storage device that are not contained in any of the plurality of files stored in the secondary storage device.

* * * * *